(12) United States Patent
Liu

(10) Patent No.: US 12,469,530 B2
(45) Date of Patent: Nov. 11, 2025

(54) CIRCUIT AND METHOD FOR DATA PROCESSING, AND SEMICONDUCTOR MEMORY

(71) Applicant: CHANGXIN MEMORY TECHNOLOGIES, INC., Hefei (CN)

(72) Inventor: Zhonglai Liu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 248 days.

(21) Appl. No.: 18/163,861

(22) Filed: Feb. 2, 2023

(65) Prior Publication Data
US 2023/0410859 A1    Dec. 21, 2023

Related U.S. Application Data

(63) Continuation of application No. PCT/CN2022/101054, filed on Jun. 24, 2022.

(30) Foreign Application Priority Data

Jun. 17, 2022   (CN) .......................... 202210691447.2

(51) Int. Cl.
  *G11C 7/10*   (2006.01)
  *G11C 5/14*   (2006.01)
  *G11C 7/22*   (2006.01)

(52) U.S. Cl.
  CPC ............ *G11C 7/1087* (2013.01); *G11C 5/148* (2013.01); *G11C 7/222* (2013.01)

(58) Field of Classification Search
  CPC ....... G11C 7/1087; G11C 5/148; G11C 7/222; G11C 2207/2227; G11C 7/1093; G11C 7/1006

USPC ..................................................... 365/189.05
See application file for complete search history.

(56) References Cited

U.S. PATENT DOCUMENTS

| | | | |
|---|---|---|---|
| 5,546,368 A | 8/1996 | Lee | |
| 5,561,649 A | 10/1996 | Lee | |
| 2013/0064008 A1* | 3/2013 | Kim | G11C 11/1673 |
| | | | 365/158 |
| 2015/0041001 A1 | 2/2015 | Li | |
| 2019/0287603 A1* | 9/2019 | Antonyan | G11C 7/227 |
| 2020/0103957 A1* | 4/2020 | Venugopal | G06F 1/3296 |
| 2020/0185010 A1* | 6/2020 | Lo | G11C 16/20 |

FOREIGN PATENT DOCUMENTS

| | | |
|---|---|---|
| CN | 1289119 A | 3/2001 |
| CN | 1992074 A | 7/2007 |
| CN | 107196352 A | 9/2017 |
| CN | 108320770 A | 7/2018 |
| CN | 110323941 A | 10/2019 |
| CN | 114242146 A | 3/2022 |
| WO | 2017038174 A1 | 3/2017 |

* cited by examiner

*Primary Examiner* — Amir Zarabian
(74) *Attorney, Agent, or Firm* — Syncoda LLC; Feng Ma

(57) ABSTRACT

A circuit for data processing includes a receiving circuit, a first power supply circuit and a processing circuit. The receiving circuit is configured to receive a data signal and determine a first node signal according to the data signal. The first power supply circuit is configured to receive an enable signal, and control, in a case that the enable signal is in a valid state, the processing circuit to be in an operating state. The processing circuit is configured to output, in a case of being in the operating state, a target data signal according to the first node signal.

17 Claims, 11 Drawing Sheets

CIRCUIT AND METHOD FOR DATA PROCESSING, AND SEMICONDUCTOR MEMORY

CROSS-REFERENCE TO RELATED APPLICATIONS

This is a continuation of International Patent Application No. PCT/CN2022/101054 filed on Jun. 24, 2022, which claims priority to Chinese Patent Application No. 202210691447.2 filed on Jun. 17, 2022. The disclosures of the above-referenced applications are hereby incorporated by reference in their entirety.

BACKGROUND

Semiconductor memories are all-important components in digital integrated circuits and play a vital role in constructing application systems of microprocessors. In recent years, various semiconductor memories are increasingly embedded into processors, so that the processors have a higher degree of integration and a higher operating speed. However, in some implementations, taking a data receiver as an example, a leak current of the data receiver in a standby state is large, and the leak current may also lead to excessively high power consumption of a circuit.

SUMMARY

The present disclosure relates to the technical field of semiconductor circuits, particularly to a circuit and method for data processing, and a semiconductor memory.

Embodiments of the present disclosure provide a circuit and method for data processing, and a semiconductor memory.

In a first aspect, the embodiments of the present disclosure provide a circuit for data processing, which includes a receiving circuit, a first power supply circuit and a processing circuit.

The receiving circuit is configured to receive a data signal and determine a first node signal according to the data signal.

The first power supply circuit is configured to receive an enable signal, and control, in a case that the enable signal is in a valid state, the processing circuit to be in an operating state.

The processing circuit is configured to output, in a case of being in the operating state, a target data signal according to the first node signal.

In a second aspect, the embodiments of the present disclosure provide a method for data processing, which is applied to a circuit for data processing including a receiving circuit, a first power supply circuit and a processing circuit. The method includes the following operations.

A data signal is received by the receiving circuit, and a first node signal is determined according to the data signal.

An enable signal is received by the first power supply circuit, and the processing circuit is controlled to be in an operating state a case that the enable signal is in a valid state.

A target data signal is outputted by the processing circuit in a case of being in the operating state according to the first node signal.

In a third aspect, the embodiments of the present disclosure provide a semiconductor memory including the circuit for data processing of any one of the first aspect.

DETAILED DESCRIPTION

Figure 1:
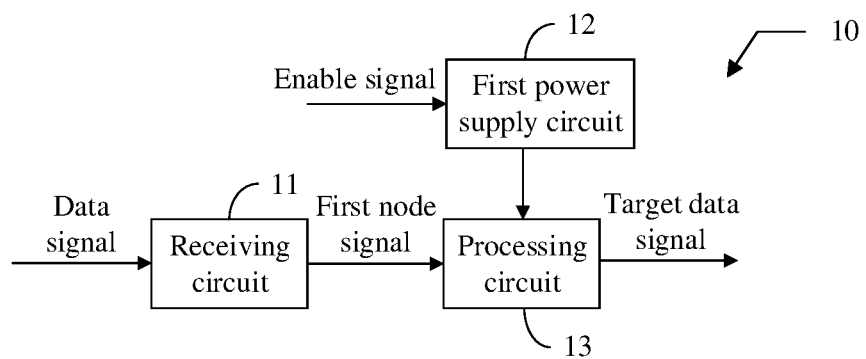
FIG. 1 is a first schematic structural diagram of a circuit for data processing according to an embodiment of the present disclosure.

The technical solutions in the embodiments of the present disclosure will be clearly and completely described in conjunction with the drawings in the embodiments of the present disclosure. It is understandable that the specific embodiments described herein are only used to illustrate the relevant disclosure, but are not intended to limit the disclosure. In addition, it is to be noted that, for the convenience of description, only the parts related to the relevant disclosure are shown in the drawings.

Unless otherwise defined, all technical and scientific terms used herein have the same meaning as commonly understood by those skilled in the art of the present disclosure. The terms used herein are only for the purpose of describing the embodiments of the present disclosure and are not intended to limit the present disclosure.

In the following description, reference is made to "some embodiments" which describe a subset of all possible embodiments, but it is understandable that "some embodiments" may be the same or different subsets of all possible embodiments, and may be combined with each other without conflict.

It is to be noted that the terms "first/second/third" involved in the embodiments of the present disclosure are only used to distinguish similar objects, and do not represent a specific order of the objects. It is understandable that the specific order or sequence of "first/second/third" may be interchangeable under the allowable circumstances, so that the embodiments of the disclosure described herein may be implemented in an order other than those illustrated or described herein.

In the circuit for data processing such as the data receiver, the leak current of the circuit for data processing in the standby mode is large, and particularly, the electric leakage is particularly obvious when a low threshold voltage device is used for speed, which will lead to excessively high power consumption of the circuit and may damage the circuit. Therefore, how to effectively reduce the power consumption of the memory becomes crucial to designing the memory.

The embodiments of the present disclosure provide a circuit for data processing, which includes a receiving circuit, a first power supply circuit and a processing circuit. The receiving circuit is configured to receive a data signal and determine a first node signal according to the data signal. The first power supply circuit is configured to receive an enable signal, and control, in a case that the enable signal is in a valid state, the processing circuit to be in an operating state. The processing circuit is configured to output, in a case of being in the operating state, a target data signal according to the first node signal. Thus, the first power supply circuit controls the operating state of the processing circuit via the enable signal, so that the processing circuit is in the operating state only when the enable signal is in the valid state, and the processing circuit is in the non-operating state in a case that the enable signal is in the invalid state, that is, the enable signal enters a standby mode. Therefore, the leak current of the circuit for data processing in the standby mode is effectively reduced, so that power consumption is saved.

The embodiments of the present disclosure will be described in detail below with reference to the drawings.

In an embodiment of the present disclosure, referring to FIG. 1, which illustrates a first schematic structural diagram of a circuit for data processing 10 according to an embodiment of the present disclosure. As shown in FIG. 1, the circuit for data processing 10 may include a receiving circuit 11, a first power supply circuit 12 and a processing circuit 13.

The receiving circuit 11 is configured to receive a data signal and determine a first node signal according to the data signal.

The first power supply circuit 12 is configured to receive an enable signal, and control, in a case that the enable signal is in a valid state, the processing circuit 13 to be in an operating state.

The processing circuit 13 is configured to output, in a case of being in the operating state, a target data signal according to the first node signal.

It is to be noted that the circuit for data processing 10 according to the embodiments of the present disclosure may be used as a part of a reading circuit, an amplifying circuit, a comparator, a data receiver or a Decision Feedback Equalizer (DFE) circuit in a memory, which may realize functions of data readout, data amplification or data comparison and the like.

It is to be further noted that the receiving circuit 11 is mainly configured to receive a data signal representing a signal processed by the circuit for data processing 10. In the embodiments of the present disclosure, a joint between the receiving circuit 11 and the processing circuit 13 is labeled as a first node, and then the receiving circuit 11 may determine a first node signal at the first node according to the data signal.

The first power supply circuit 12 is mainly configured to control a state of the processing circuit 13 and control the processing circuit 13 to be in the operating state or the non-operating state based on the enable signal. Specifically, the first power supply circuit 12 first receives the enable signal and controls, in a case that the enable signal is in the valid state, the processing circuit 13 to be in the operating state. At this time, the processing circuit 13 will output the target data signal according to the first node signal. The first power supply circuit 12 controls, in a case that the enable signal is in the invalid state, the processing circuit 13 to be in the non-operating state. At this time, the processing circuit 13 does not operate, so that no leak current will be generated.

Thus, the state of the processing circuit 13 is controlled by the first power supply circuit 12. The processing circuit 13 is in the operating state only when the enable signal is in the valid state, so that the leak current generated by the processing circuit 13 may be reduced, and the power consumption of the circuit for data processing 10 in the standby state is saved.

Figure 2:
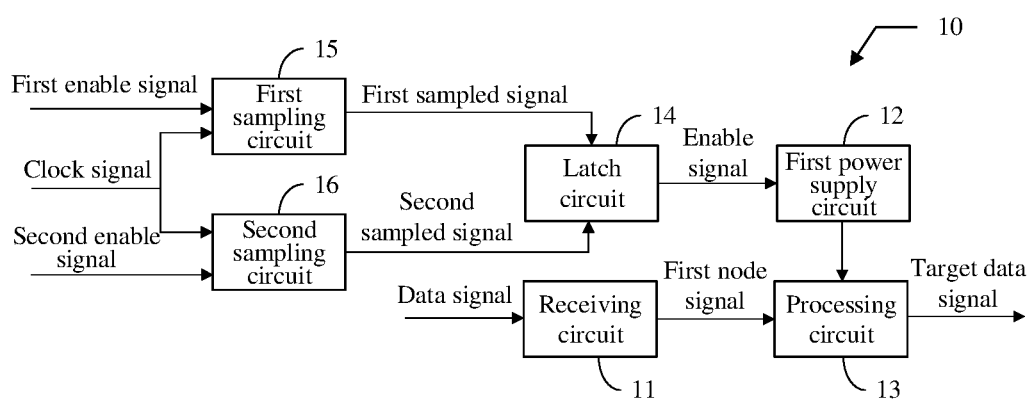
FIG. 2 is a second schematic structural diagram of a circuit for data processing according to an embodiment of the present disclosure.

For generation of the enable signal, referring to FIG. 2, which illustrates a second schematic structural diagram of a circuit for data processing 10 according to an embodiment of the present disclosure. As shown in FIG. 2, in some embodiments, the circuit for data processing 10 may further include a latch circuit 14.

The latch circuit 14 is configured to receive a first sampled signal and a second sampled signal, and perform latch processing on the first sampled signal and the second sampled signal to generate the enable signal.

The second sampled signal is delayed by a preset clock period with respect to the first sampled signal, and the enable signal is valid within the preset clock period.

It is to be noted that the latch circuit 14 is connected to the first power supply circuit 12 and is configured to provide the enable signal to the first power supply circuit 12. Specifically, the latch circuit 14 receives the first sampled signal and the second sampled signal, generates the enable signal after performing latch processing, and transmits the enable signal to the first power supply circuit 12. Herein, the second sampled signal is delayed by a preset clock period with respect to the first sampled signal, and the enable signal is in the valid state within the preset clock period.

It is to be further noted that in the embodiments of the present disclosure, the latch circuit 14 may be specifically implemented by an SR latch, which is a bistable flip-flop. In a case that there is no external trigger signal, the set-reset latch will keep the original state unchanged. In a case that there is external trigger signal effect, the output state may be changed, that is, the output state of the SR latch is directly controlled by the input signal.

Figure 3:
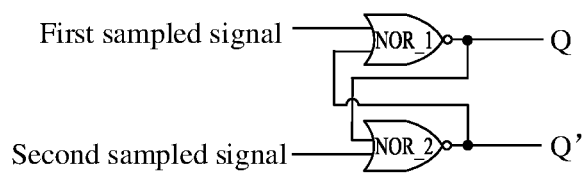
FIG. 3 is a schematic structural diagram of a Set-Reset (SR) latch according to an embodiment of the present disclosure.

Exemplarily, referring to FIG. 3, which illustrates a schematic structural diagram of a SR latch according to an embodiment of the present disclosure. As shown in FIG. 3, the SR latch is composed of two NOR gates. Herein, two input ends of the first NOR gate NOR_1 respectively receive the first sampled signal and an output signal Q' of the second NOR gate NOR_2, and an output signal of the first NOR gate NOR_1 is Q. Two input ends of the second NOR gate NOR_2 respectively receive the second sampled signal and the output signal Q of the first NOR gate NOR_1. In the embodiments of the present disclosure, the enable signal may be the output signal Q of the first NOR gate NOR_1 or the output signal Q' of the second NOR gate NOR_2, which is determined in conjunction with an actual circuit structure.

Figure 4:
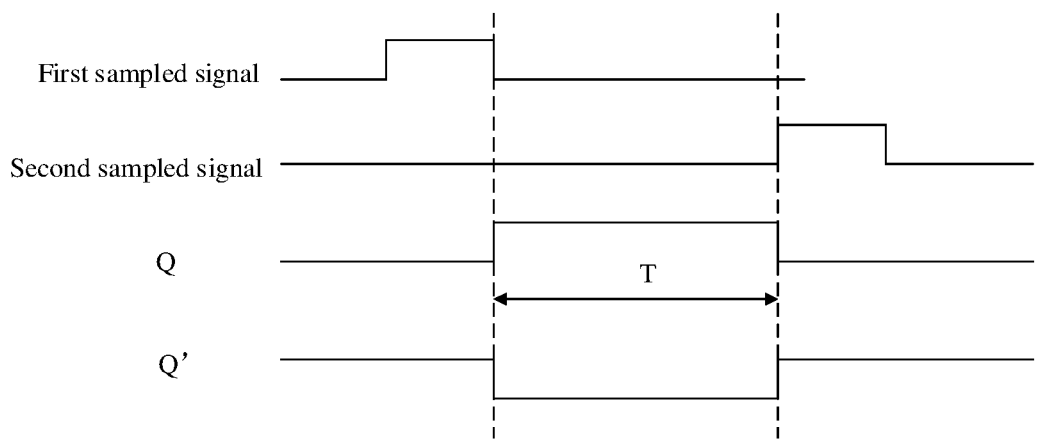
FIG. 4 is a first schematic diagram of a signal time sequence according to an embodiment of the present disclosure.

Exemplarily, referring to FIG. 4, which 4 illustrates a first schematic diagram of a signal time sequence according to an embodiment of the present disclosure. As show in FIG. 4, the second sampled signal is delayed by a preset clock period T with respect to the first sampled signal, and the enable signal may be Q or Q'. In a case that the enable signal is a high level valid signal, Q is determined as the enable signal. At this time, an output end of the first NOR gate NOR_1 is connected to the first power supply circuit 12. In a case that the enable signal is a low level valid signal, Q' is determined as the enable signal. At this time, an output end of the second NOR gate NOR_2 is connected to the first power supply circuit 12.

In this way, since the enable signal is only valid within the preset clock period, that is, within the preset clock period, the processing circuit 13 is in the operating state. Beyond the preset clock period, the processing circuit 13 is in the non-operating state, so that generation of the leak current is reduced.

Further, as shown in FIG. 2, in some embodiments, the circuit for data processing 10 may further include a first sampling circuit 15 and a second sampling circuit 16.

The first sampling circuit 15 is configured to receive a first enable signal and a clock signal, and perform, according to the clock signal, sampling processing on the first enable signal to generate the first sampled signal.

The second sampling circuit 16 is configured to receive a second enable signal and the clock signal, and perform, according to the clock signal, sampling processing on the second enable signal to generate the second sampled signal.

It is to be noted that the first sampled signal may be obtained by sampling the first enable signal by the first sampling circuit 15, and the second sampled signal may be obtained by sampling the second enable signal by the second sampling circuit 16. The first sampling circuit 15 and the second sampling circuit 16 both may be composed of several flip-flops.

It is to be further noted that the enable signal may be generated based on the command signal which is a signal related to operations executed by the circuit for data processing 10. For example, in a case that the circuit for data processing 10 is used as a part of the data receiving circuit in the memory, the command signal may be a read signal.

Exemplarily, the first enable signal and the second enable signal both may be command signals. In the first sampling circuit 15 and the second sampling circuit 16, the command signals are respectively sampled and delayed to different extents through different quantities of flip-flops to obtain the first sampled signal and the second sampled signal.

Figure 5:
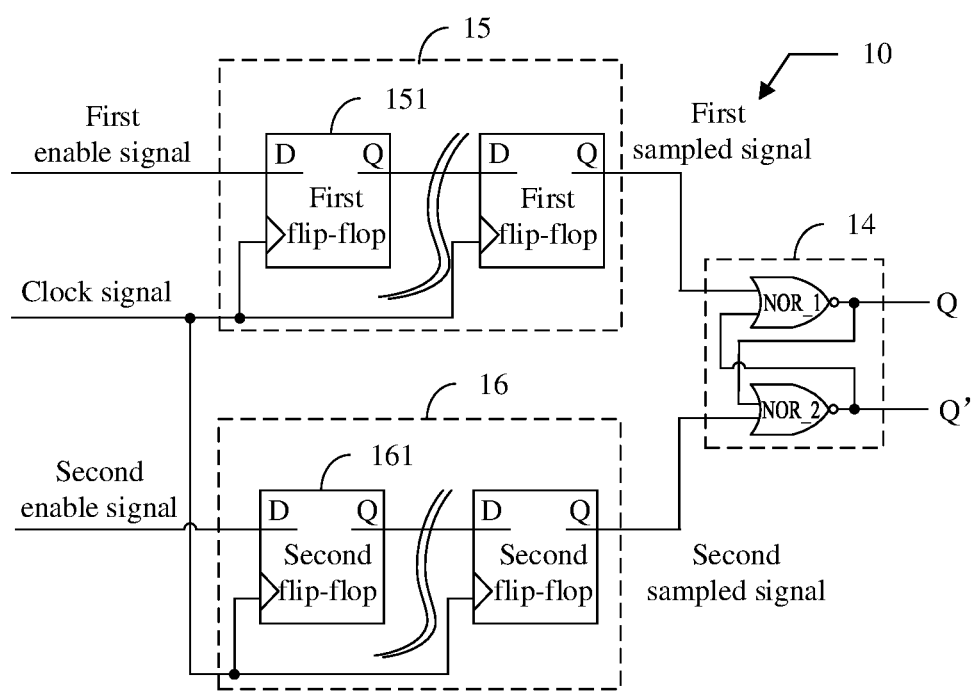
FIG. 5 is a first schematic structural diagram of partial of a circuit for data processing according to an embodiment of the present disclosure.

Referring to FIG. 5, which illustrates a first schematic structural diagram of partial of a circuit for data processing 10 according to an embodiment of the present disclosure. As shown in FIG. 5, in a specific embodiment, the first sampling circuit 15 includes N first flip-flops 151, clock ends of the first flip-flops 151 all are used to receive the clock signal, an output end of an i-th one of the first flip-flops 151 is connected to an input end of an (i+1)-th one of the first flip-flops 151, an input end of a first one of the first flip-flops 151 is used to receive the first enable signal, and an output end of an N-th one of the first flip-flops 151 is used to output the first sampled signal, where i is an integer greater than 0 and smaller than N, and N is an integer greater than 0.

The second sampling circuit 161 includes M second flip-flops 161, clock ends of the second flip-flops 161 all are used to receive the clock signal, an output end of a j-th one of the second flip-flops 161 is connected to an input end of an (j+1)-th one of the second flip-flops 161, an input end of a first one of the second flip-flops 161 is used to receive the second enable signal, and an output end of an M-th one of the second flip-flops 161 is used to output the second sampled signal, where j is an integer greater than 0 and smaller than M, and M is an integer greater than 0.

It is to be noted that as shown in FIG. 5, the first sampling circuit 15 and the second sampling circuit 16 both may include several flip-flops. For the convenience of differentiation, the flip-flops included in the first sampling circuit 15 are labeled as the first flip-flops 151 and the flip-flops included in the second sampling circuit 16 are labeled as the second flip-flops 161. Herein, the first flip-flops 151 and the second flip-flops 161 may be same type flip-flops. For example, the first flip-flops 151 and the second flip-flops 161 may both be Data flip-flops (D flip-flops or also called Complementary Metal-Oxide-Semiconductor (CMOS) flip-flops).

As shown in FIG. 5, each of the first flip-flops 151 and each of the second flip-flops 161 both include input ends (shown by D in FIG. 5), output ends (shown by Q in FIG. 5) and clock ends (shown by > in FIG. 5). Herein, the clock ends of the first flip-flop 151 and the second flip-flop 161 are used to receive the clock signal. In the first sampling circuit 15, N first flip-flops 151 are connected in series together, the input end of the first one of the first flip-flops 151 is used to receive the first enable signal, the output end of the N-th one of the first flip-flops 151 is used to output the first sampled signal, and the input ends of the second one of the first flip-flops to the N-th one of the first flip-flops all are connected to the output ends of the previous one of the first flip-flops 151. In this way, the first flip-flops 151 all perform sampling processing on the signals received by the input ends thereof based on the clock signal, and delay and latch the signals till the N-th one of the first flip-flops 151 outputs the first sampled signal.

In the second sampling circuit 16, M second flip-flops 161 are connected in series together, the input end of the first one of the second flip-flops 161 is used to receive the second enable signal, the output end of the M-th one of the second flip-flops 161 is used to output the second sampled signal, and the input ends of the second one of the second flip-flops 161 to the M-th one of the second flip-flop 161 all are connected to the output ends of the previous one of the second flip-flops 161. N and M may be same or different. In this way, the second flip-flops 161 all perform sampling processing on the signals received by the input ends thereof based on the clock signal, and delay and latch the signals till the M-th one of the second flip-flops 161 outputs the second sampled signal.

As mentioned above, the first enable signal and the second enable signal both may be command signals. The quantities of the first flip-flops 151 and the second flip-flops 161 may be set in conjunction with the preset clock period, so that the second sampled signal is delayed by the preset clock period with respect to the first sampled signal.

Figure 6:
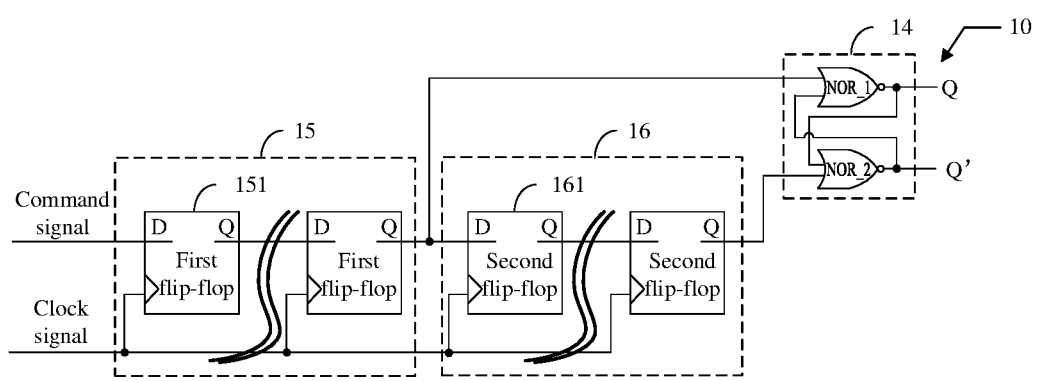
FIG. 6 is a second schematic structural diagram of partial of a circuit for data processing according to an embodiment of the present disclosure.

Further, in some embodiments, the first enable signal includes a command signal, and the second enable signal includes a first sampled signal. At this time, referring to FIG. 6, which illustrates a second schematic structural diagram of partial of a circuit for data processing 10 according to an embodiment of the present disclosure. As shown in FIG. 6, the first sampling circuit 15 includes N first flip-flops 151, clock ends of the first flip-flops 151 all are used to receive the clock signal, the output end of the i-th one of the first flip-flops 151 is connected to an input end of the (i+1)-th one of the first flip-flops 151, an input end of the first one of the first flip-flops 151 is used to receive the command signal, and an output end of the N-th one of the first flip-flops 151 is used to output the first sampled signal, where i is an integer greater than 0 and smaller than N, and N is an integer greater than 0.

The second sampling circuit 16 includes M second flip-flops 161, clock ends of the second flip-flops 161 all are used to receive the clock signal, an output end of the j-th one of the second flip-flops 161 is connected to an input end of the (j+1)-th one of the second flip-flops 161, an input end of the first one of the second flip-flops 161 is connected to the output end of the N-th one of the first flip-flops 151 and is used to receive the first sampled signal, and an output end of the M-th one of the second flip-flops 161 is used to output the second sampled signal, where j is an integer greater than 0 and smaller than M, and M is an integer greater than 0.

It is to be noted that as shown in FIG. 6, different from FIG. 5, the output end of the N-th one of the first flip-flops 151 in FIG. 6 is not only connected to the latch circuit 14 but also is connected to the input end of the first one of the second flip-flops 161. That is, in the embodiment of the present disclosure, the first sampling circuit 15 and the second sampling circuit 16 may be connected in series together. At this time, the first enable signal may be the command signal and the second enable signal may the first sampled signal. That is to say, the second sampled signal may be obtained by sampling and delaying the first sampled signal.

In addition, as show in FIG. 5 or FIG. 6, the latch circuit 14 may include a latch. A first input end of the latch is connected to the output end of the N-th one of the first flip-flops 151 to receive the first sampled signal. A second input end of the latch is connected to the output end of the M-th one of the second flip-flops 161 to receive the second sampled signal. An output end of the latch is used to output the enable signal.

It is to be noted that in FIG. 5 or FIG. 6, in the latch circuit 14, the first input end of the latch, that is, an input end of the first NOR gate NOR_1 is connected to the output end of the N-th one of the first flip-flops 151 to receive the first sampled signal. The second input end of the latch, that is, an input end of the second NOR gate NOR_2 is connected to the output end of the M-th one of the second flip-flops 161 to receive the second sampled signal. The output end of the latch is used to output the enable signal Q or Q'.

Figure 7:
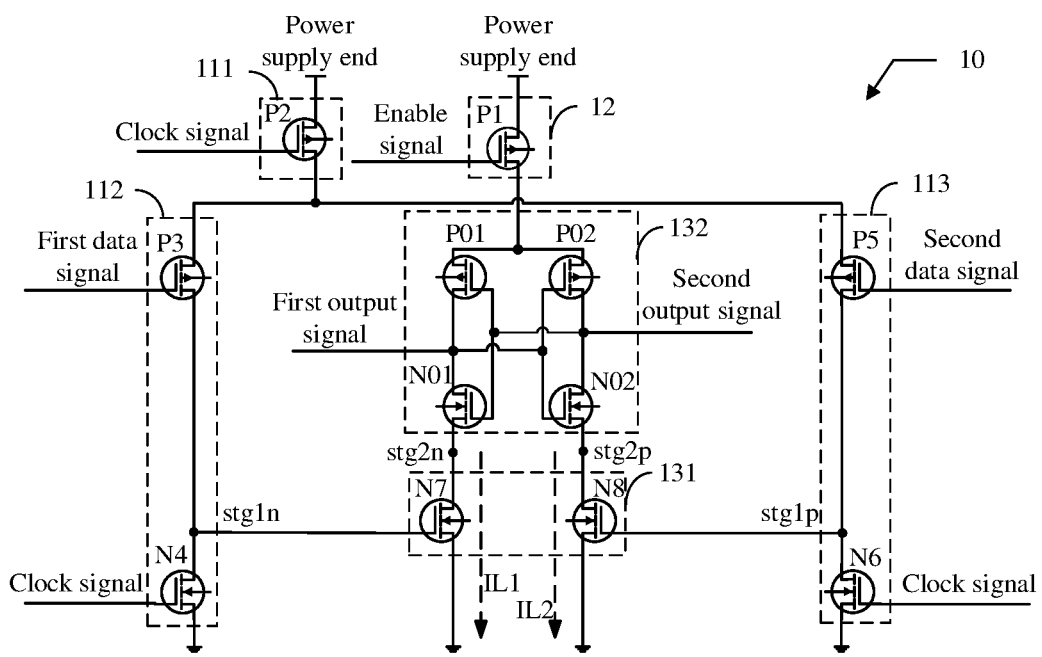
FIG. 7 is a first specific schematic structural diagram of a circuit for data processing according to an embodiment of the present disclosure.

Further, for the first power supply circuit 12, referring to FIG. 7, which illustrates a first specific schematic structural diagram of a circuit for data processing 10 according to an embodiment of the present disclosure. As shown in FIG. 7, in some embodiments, the first power supply circuit 12 includes a first switch P1, a control end of the first switch P1 is configured to receive the enable signal, a first end of the first switch P1 is connected to the processing circuit 13, and a second end of the first switch P1 is connected to a power supply end.

The first power supply circuit 12 is configured to: control, in a case that the enable signal is in the valid state, the first switch P1 to be in an on state, to enable the processing circuit 13 to be in the operating state; and control, in a case that the enable signal in an invalid state, the first switch P1 to be in an off state, to enable the processing circuit 13 to be in a non-operating state.

It is to be noted that as shown in FIG. 7, state control to the processing circuit 13 by the first power supply circuit 12 may be implemented through the first switch P1. The first switch P1 may be a device such as a diode, a triode, a PMOS or an NMOS with a switch control function. Herein, the first switch P1 being the PMOS is taken as an example to describe specific implementation of the embodiments of the present disclosure in detail.

The control end of the first switch P1 is a gate, the first end of the first switch P1 may be a drain, and the second end of the first switch P1 is may be a source. Since the PMOS has the characteristic of being on at a low level and being off at a high level, for the first switch P1, the valid state of the enable signal is the low level state, that is, in this case, the enable signal is Q' in FIG. 4. In this way, in a case that the enable signal is in the low level state, the first switch P1 is on, and the processing circuit 13 is in the operating state. In a case that the enable signal in the high level state, the first switch P1 is off, and the processing circuit 13 is in the non-operating state. Therefore, the processing circuit 13 only operates during the valid period of the enable signal, and the processing circuit 13 is prevented from generating the leak current within the non-operating period, so that the power consumption of the circuit is saved.

Further, for the receiving circuit 11, referring to FIG. 7, in some embodiments, the receiving circuit 11 includes a second power supply circuit 111, a first control circuit 112 and a second control circuit 113.

The second power supply circuit 111 is configured to receive the clock signal, and control, according to the clock signal, a connection state between the power supply end and the first control circuit 112 and a connection state between the power supply end and the second control circuit 113.

The first control circuit 112 is configured to receive a first data signal, and control, according to the connection state between the power supply end and the first control circuit 112, the first data signal to generate a first sub node signal.

The second control circuit 113 is configured to receive a second data signal, and control, according to the connection state between the power supply end and the second control circuit 113, the second data signal to generate a second sub node signal.

It is to be noted that the receiving circuit 11 not only receives the data signal, but also receives the clock signal. The clock signal is used to realize control of a charging state and a discharging state of the first node. As shown in FIG. 7, the second power supply circuit 111 simultaneously controls, according to the received clock signal, a connection state between the power supply end and the first control circuit 112 and a connection state between the power supply end and the second control circuit 113. Herein, the connection state may include connection of the first control circuit 112 and the second control circuit 113 to the power supply end or disconnection of first control circuit 112 and the second control circuit 113 to the power supply end.

It is to be further noted that in the embodiments of the present disclosure, the data signal may include a first data signal and a second data signal. The first control circuit 112 receives the first data signal, and the second control circuit 113 receives the second data signal. Since the first control circuit 112 and the second control circuit 113 both are connected to the processing circuit 13, the first node specifically includes two nodes. A joint between the first control circuit 112 and the processing circuit 13 is labeled as a first sub node stg1$n$, and a joint between the second control circuit 113 and the processing circuit 13 is labeled as a second sub node stg1$p$.

The first control circuit 112 generates a first sub node signal at the first sub node stg1$n$ according to the first data signal and the connection state between the first control circuit 112 and the power supply end. Similarly, the second control circuit 113 generates a second sub node signal at the second sub node stg1$p$ according to the second data signal and the connection state between the second control circuit 113 and the power supply end.

Further, for control of the connection state between the power supply end and the first control circuit 112 and the connection state between the power supply end and the second control circuit 113, as shown in FIG. 7, in some embodiments, the second power supply circuit 111 includes a second switch P2, a control end of the second switch P2 is configured to receive the clock signal, a first end of the second switch P2 is respectively connected to the first control circuit 112 and the second control circuit 113, and a second end of the second switch P2 is connected to the power supply end.

The second power supply circuit 111 is configured to: control, in a case that the clock signal is in a first level state, the second switch P2 to be in the on state, to enable the power supply end and the first control circuit 112 to be in the connection state and the power supply end and the second control circuit 113 to be in the connection state; and control, in a case that the clock signal is in a second level state, the second switch P2 to be in the off state, to enable the power supply end and the first control circuit 112 to be in a non-connection state and the power supply end and the second control circuit 113 to be in the non-connection state.

It is to be noted that the second power supply circuit 111 may be implemented by the second switch P2. The second switch P2 may be a device such as a diode, a triode or a field-effect tube with a switch control function. Herein, the second switch P2 being the PMOS is taken as an example to describe specific implementation of the embodiments of the present disclosure in detail.

It is to be further noted that the control end, that is, the gate of the second switch P2 is configured to receive the clock signal. Corresponding to different level states of the clock signal, the second switch P2 may be on or off. The second end of the second switch P2 may be the source, and is connected to the power supply end. The first end of the second switch P2 may be the drain, and is respectively connected to the first control circuit 112 and the second control circuit 113. In a case that the clock signal is in the first level state, the second switch P2 is on, so that the first control circuit 112 and the second control circuit 113 both may be connected to the power supply end. Since the second switch P2 is the PMOS, the first level state represents the low level state. In a case that the clock signal is in the second level state, the second switch P2 is off, the first control circuit 112 and the second control circuit 113 both are not connected to the power supply end. Since the second switch P2 is the PMOS, the second level state represents the high level state.

Further, for the first control circuit 112 and the second control circuit 113, referring to FIG. 7, in some embodiments, the first control circuit 112 includes a third switch P3 and a fourth switch N4. The second control circuit 113 includes a fifth switch P5 and a sixth switch N6.

A control end of the third switch P3 is configured to receive the first data signal, the second end of the third switch P3 is connected to a first end of the second switch P2, a control end of the fourth switch N4 is configured to receive the clock signal, and a second end of the fourth switch N4 is grounded. A first end of the third switch P3 is connected to a first end of the fourth switch N4, and is configured to output a first sub node signal.

A control end of the fifth switch P5 is configured to receive the second data signal, a second end of the fifth switch P5 is connected to the first end of the second switch P2, a control end of the sixth switch N6 is configured to receive the clock signal, and a second end of the sixth switch N6 is grounded. A first end of the fifth switch P5 is connected to a first end of the sixth switch N6, and is configured to output a second sub node signal.

It is to be noted that taking the third switch P3 and the fifth switch P5 being the PMOSs and the fourth switch N4 and the sixth switch N6 being the NMOSs as an example, in the first control circuit 112 and the second control circuit 113, the control ends of the third switch P3, the fourth switch N4, the fifth switch P5 and the sixth switch N6 all represent the gates, the first ends thereof all represent the drains, and the second ends thereof all represent the sources.

In the first control circuit 112, the gate of the third switch P3 receives the first data signal, the gate of the fourth switch N4 receives the clock signal, and the first end of the third switch P3 and the first end of the fourth switch N4 are connected to the first sub node stg1n and output the first sub node signal at the first sub node stg1n.

In the second control circuit 113, the gate of the fifth switch P5 receives the second data signal, the gate of the sixth switch N6 receives the clock signal, and the first end of the fifth switch P5 and the first end of the sixth switch N6 are connected to the second sub node stg1p and output the second sub node signal at the second sub node stg1p.

Further, in some embodiments, the first control circuit 112 is configured to control, in a case that the clock signal is in the first level state, the fourth switch N4 to be in the off state, and control, in a case that the clock signal is in the second level state, the fourth switch N4 to be in the on state.

The second control circuit 113 is configured to control, in a case that the clock signal is in the first level state, the sixth switch N6 to be in the off state, and control, in a case that the clock signal is in the second level state, the sixth switch N6 to be in the on state.

It is to be noted that the fourth switch N4 and the sixth switch N6 both may be the NMOSs. At this time, the first level state represents the low level state and the second level state represents the high level state. That is, in a case that the clock signal is in the first level state, the gates of the fourth switch N4 and the sixth switch N6 receive the clock signal at the low level and the fourth switch N4 and the sixth switch N6 are in the off state. In a case that the clock signal is in the second level state, the gates of the fourth switch N4 and the sixth switch N6 receive the clock signal at the high level and the fourth switch N4 and the sixth switch N6 are in the on state.

It is to be further noted that in the receiving circuit 11, in a case that the clock signal in the low level state, the second switch P2 is in the on state, and at this time, the first end of the second switch P2 is clamped to a power supply voltage (equivalent to the high level state), the first control circuit 112 and the power supply end are in the connection state, and the second control circuit 113 and the power supply end are also in the connection state. That is, the first end of the third switch P3 and the first end of the fifth switch P5 are connected to the power supply end through the second switch P2, and both are raised to the power supply voltage. Meanwhile, the fourth switch N4 and the sixth switch N6 both are in the off state.

In a case that the clock signal is in the low level state, for the first control circuit 112, in a case that the first data signal is a data signal in the high level state, the third switch P3 is not on (or the on degree is very low). Since the third switch P3 and the fourth switch N4 both are not on, the first sub node signal is neither the power supply voltage (the high level state) nor a grounding voltage (the low level state). In a case that the first data signal is a data signal in the low level state, the third switch P3 is on, and the first end of the third switch P3 is clamped to the power supply voltage, so that the first sub node signal is in the high level state. For the second control circuit 113, in a case that the second data signal is a data signal in the high level state, the fifth switch P5 is not on (or the on degree is very low). Since the fifth switch P5 and the sixth switch N6 both are not on, the second sub node signal is neither the power supply voltage (the high level state) nor a grounding voltage (the low level state). In a case that the second data signal is a data signal in the low level state, the fifth switch P5 is on, and the first end of the fifth switch P5 is clamped to the power supply voltage, so that the second sub node signal is in the high level state. At this time, the first sub node stg1n and/or the second sub node stg1p are in the charging state, that is, they are charged till the node level gradually becomes the power supply voltage.

In a case that the clock signal is in the high level state, since the second switch P2 is in the off state, both the first control circuit 112 and the second control circuit 113 are disconnected to the power supply end. At this time, regardless of the level states of the first data signal and the second data signal, the third switch P3 and the fifth switch P5 both are not on. Therefore, the first sub node signal and the second sub node signal both are not in the high level state. Meanwhile, the fourth switch N4 and the sixth switch N6 both are in the on state. Since the second ends of the fourth switch N4 and the sixth switch N6 both are grounded, the first ends of the fourth switch N4 and the sixth switch N6 are clamped to the grounding voltage (equivalent to the low level state), and the first sub node signal and the second sub node signal both are in the low level state. At this time, the first sub node stg1n and the second sub node stg1p are in the discharging state, that is, they are discharged till the node level gradually becomes the grounding voltage.

It is to be further noted that in an actual application, the first data signal and the second data signal are usually a pair of differential signals which are not usually in the high level state simultaneously or in the low level state simultaneously, but are in high and low level state relatively. The first control circuit 112 obtains the first sub node signal according to the first data signal, the second control circuit 113 obtains the second sub node signal according to the second data signal. The first sub node signal and the second sub node signal may also be regarded as a pair of differential signals.

For the processing circuit 13, referring to FIG. 7, in some embodiments, the processing circuit 13 includes a differential circuit 131 and a cross coupling circuit 132.

The differential circuit 131 is configured to receive the first sub node signal and the second sub node signal, and perform differential processing on the first sub node signal and the second sub node signal to generate a third sub node signal and a fourth sub node signal.

The cross coupling circuit 132 is configured to perform amplification processing on the third sub node signal and the fourth sub node signal to generate a first output signal and a second output signal. Herein, the target data signal is composed of the first output signal and the second output signal.

It is to be noted that in a case that the enable signal is in the valid state, the processing circuit 13 is in the operating state. The processing circuit 13 includes the differential circuit 131 and the cross coupling circuit 132. The differential circuit 131 respectively receives the first sub node signal and the second sub node signal, a third sub node signal and a fourth sub node signal are obtained after the first sub node signal and the second sub node signal are processed by the differential circuit 131, and the third sub node signal and the fourth sub node signal are transmitted to the cross coupling circuit 132. The cross coupling circuit 132 performs amplification processing on the third sub node signal and the fourth sub node signal to generate a target data signal. The target data signal specifically includes a first output signal and a second output signal.

In the embodiments of the present disclosure, as shown in FIG. 7, the differential circuit 131 is further configured to release the leak currents IL1 and IL2 generated by the cross coupling circuit 132.

Further, for the differential circuit 131, referring to FIG. 7, in some embodiments, the differential circuit 131 includes a seventh switch N7 and an eighth switch N8.

The control end of the seventh switch N7 is connected to the first end of the third switch P3 and the first end of the fourth switch N4, and is configured to receive the first sub node signal. The first end of the seventh switch N7 is connected to the cross coupling circuit 132, and is configured to output the third sub node signal. The second end of the seventh switch N7 is grounded.

The control end of the eighth switch N8 is connected to the first end of the fifth switch P5 and the first end of the sixth switch N6, and is configured to receive the second sub node signal. The first end of the eighth switch N8 is connected to the cross coupling circuit 132, and is configured to output the fourth sub node signal. The second end of the eighth switch N8 is grounded.

It is to be noted that taking the seventh switch N7 and the eighth switch N8 both being the NMOSs as an example, the control ends of the seventh switch N7 and the eighth switch N8 both are gates, the first end of the seventh switch N7 and the eighth switch N8 both may be drains, and the second ends of the seventh switch N7 and the eighth switch N8 both may be sources.

The gate of the seventh switch N7, the first end of the third switch P3 and the first end of the fourth switch N4 are connected at the first sub node stg1n, and the first end of the seventh switch N7 and the cross coupling circuit 132 are connected at the third sub node stg2n. The gate of the eighth switch N8, the first end of the fifth switch P5 and the first end of the sixth switch N6 are connected at the second sub node stg1p, and the eighth switch N8 and the cross coupling circuit 132 are connected at the fourth sub node stg2p.

It is to be further noted that the gate of the seventh switch N7 receives the first sub node signal, and the gate of the eighth switch N8 receives the second sub node signal. The first sub node signal and the third sub node signal may be regarded as a pair of differential signals. The NMOS is on in a case that the gate receives the high level signal. Since the second ends of the seventh switch N7 and the eighth switch N8 both are grounded, the level of the first end of the seventh switch N7 may be lowered to the grounding voltage in a case that the seventh switch N7 is on. Similarly, the level of the first end of the eighth switch N8 may be lowered to the grounding voltage in a case that the eighth switch N8 is on. At this time, for the seventh switch N7 and the eighth switch N8, the switches with the gate signals at higher level state may raise the first end thereof more rapidly to the grounding voltage and transmit the third sub node signal and the fourth sub node signal corresponding to the first end to the cross coupling circuit 132. Meanwhile, the seventh switch N7 and the eighth switch N8 release the leak currents IL1 and IL2 generated by the cross coupling circuit 132 to the ground.

Further, for the cross coupling circuit 132, referring to FIG. 7, In some embodiments, the cross coupling circuit 132 includes a first PMOS P01, a second PMOS P02, a first NMOS N01 and a second NMOS N02.

A source of the first PMOS P01 is connected to a source of the second PMOS P02 and the first end of the first switch P1.

A drain of the first PMOS P01 is connected to a drain of the first NMOS N01 to output the first output signal.

A drain of the second PMOS P02 is connected to a drain of the second NMOS N02 to output the second output signal.

A gate of the first PMOS P01 is connected to a gate of the first NMOS N01 to receive the second output signal.

A gate of the second PMOS P02 is connected to a gate of the second NMOS N02 to receive the first output signal.

A source of the first NMOS N01 is connected to the first end of the seventh switch N7 to receive the third sub node signal.

A source of the second NMOS N02 is connected to the first end of the eighth switch N8 to receive the fourth sub node signal.

It is to be noted that the cross coupling circuit 132 is composed of a pair of NMOSs and a pair of PMOSs. Herein, the first ends of the first NMOS N01, the second NMOS N02, the first PMOS P01 and the second PMOS P02 all represent the sources, and the second ends of the first NMOS N01, the second NMOS N02, the first PMOS P01 and the second PMOS P02 all represent the drains.

It is to be further noted that in some embodiments, the circuit for data processing 10 may further include a precharging circuit.

The precharging circuit is configured to precharge an initial data signal outputted by the processing circuit 13.

The processing circuit 13 is further configured to: in the case of being in the operating state, perform, according to the first node signal and the initial data signal, signal amplification, and output the target data signal.

It is to be noted that the processing circuit 13 is configured to amplify a small difference between the signals to finally output a pair of inverted output signals, which is the target data signals. Prior to amplifying the signal, it further needs to precharge the output signal (at this time, the data signal has not been processed yet, and the output signal of the processing circuit 13 at this time is called as the initial data signal) of the processing circuit 13. At this time, the initial data signal of the output end of the processing circuit 13 may be precharged to a preset voltage value through the precharging circuit (not shown in the figure), for example, precharged to VDD/2.

It is to be further noted that the initial data signal includes a first initial data signal and a second initial data signal. After precharging, the gate signals of the second PMOS P02 and the second NMOS N02 both are the first initial data signals, and the gate signals of the first PMOS P01 and the first NMOS N01 both are the second initial data signals. Voltages of the first initial data signal and the second initial data signal both may be VDD/2 (VDD represents the power supply voltage). The source of the first PMOS P01 is connected to the source of the second PMOS P02 and is connected to the drain of the first switch P1, that is, the sources of the first PMOS P01 and the second PMOS P02 both are connected to the power supply end. The source of the first NMOS N01 is connected to the first end of the seventh switch N7 at the third sub node stg2n, and the source of the second NMOS N02 is connected to the first end of the eighth switch N8 at the fourth sub node stg2p. In a case that the processing circuit 13 is in the operating state, the gate of the seventh switch N7 receives the first sub node signal controlled to generate by the first data signal, and the gate of the eighth switch N8 receives the second sub node signal controlled to generate by the second data signal. Since the first sub node signal and the second sub node signal are a pair of differential signals, the on speeds of the seventh switch N7 and the eighth switch N8 are different.

Exemplarily, since precharging has been performed, the gate signals of the first NMOS N01, the second NMOS N02, the first PMOS P01 and the second PMOS P02 all are VDD/2, and then four transistors all are in very low on state. In a case that the level state of the first data signal is lower than the level state of the second data signal, the level state of the first sub node signal is higher than the level state of the second sub node signal and the seventh switch N7 is on more rapidly with respect to the eighth switch N8, so that the third sub node signal is more rapidly lowered to the low level state till reaching the grounding voltage, and the drain of the first NMOS N01 is more rapidly lowered till reaching the grounding voltage. The gate signal of the second PMOS P02 is the drain signal of the first NMOS N01, that is, the gate signal of the second PMOS is more approximate to the grounding voltage. With respect to the VDD/2 after precharging, the on degree of the second PMOS P02 is increased, and meanwhile, since the source of the second PMOS P02 is kept in connection to the power supply end, the drain of the second PMOS P02 will further be more approximate to the power supply voltage to a greater extent. The drain signal of the second PMOS P02 is the gate signal of the first NMOS N01, that is, the gate signal of the first NMOS N01 is more approximate to the power supply voltage. With respect to VDD/2 after precharging, the on degree of the first NMOS N01 is increased, so that the drain of the first NMOS N01 will further be more approximate to the grounding voltage to a greater extent. In this way, subjected to coupling amplification by the cross coupling circuit 132, the stable low level first output signal and the stable high level second output signal may be outputted finally. Amplified output of the differential signals is implemented.

It is to be further noted that in a case that the circuit for data processing 10 is used as a data reading circuit, the first data signal may represent a read signal, the second data signal may represent a reference signal, and the level state of the reference signal may be VDD/2 all the time. In a case that the first data signal is in the low level state, that is, the level state of the first data signal is lower than that of the second data signal, the first sub node signal is higher than the second sub node signal, the first output signal is finally in the low level state, and the second data signal is in the high level state. In a case that the first data signal is in the high level state, that is, the level state of the first data signal is higher than that of the second data signal, the first sub node signal is lower than the second sub node signal, the first output signal is finally in the high level state, and the second data signal is in the low level state Therefore, further amplified output of difference between the differential signals is implemented, that is, "the relatively high level state is outputted as the high level, and the relatively low level state is outputted as the low level".

Figure 8:
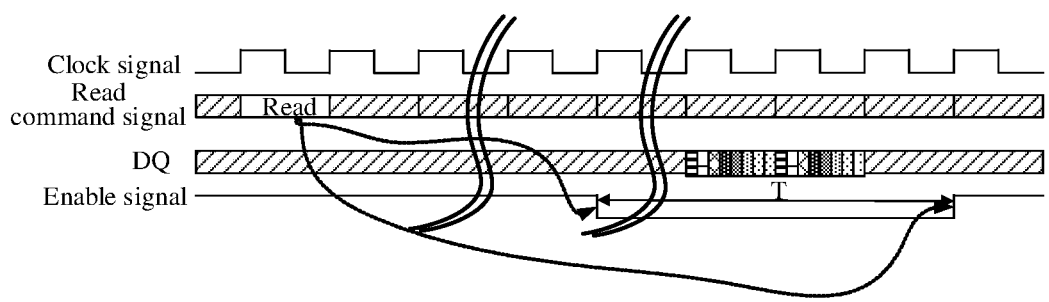
FIG. 8 is a second schematic diagram of a signal time sequence according to an embodiment of the present disclosure.

Exemplarily, referring to FIG. 8, which illustrates a second schematic diagram of a signal time sequence according to an embodiment of the present disclosure. In FIG. 8, it respectively illustrates schematic diagrams of time sequences of the clock signal, the read command signal, the read data DQ and the enable signal.

It is to be noted that the command signal corresponding to the schematic diagram of the signal time sequence shown in FIG. 8 is a read command signal, and the circuit generating the enable signal is shown in FIG. 6. As shown in FIG. 8, the processing circuit 13 operates only within a preset clock period T and is in the non-operating state during other times. The DQ is equivalent to the first data signal, and finally, the DQ may be amplified to the first output signal to be outputted.

Combined with the above-mentioned analysis, in some embodiments, in a case that the enable signal is in the valid state and the clock signal is in the first level state:

in response to a level state of the first data signal being greater than a level state of the second data signal, the first output signal is a first value and the second output signal is a second value; and in response to the level state of the first data signal being smaller than the level state of the second data signal, the first output signal is the second value and the second output signal is the first value.

It is to be noted that the first value may be 1 and the second value may be 0. That is to say, in a case that the enable signal is in the valid state, the processing circuit 13 is in the operating state and is configured to perform amplified outputting on the data signal and release the leak current generated by the processing circuit 13. Furthermore, in a case that the clock signal is in the first level state, the receiving circuit 11 is in a receiving state. The first sub node stg1n and the second sub node stg1p are charged to respectively obtain the first sub node signal and the second sub node signal, which are processed and outputted by the processing circuit 13.

In a case that the level state of the first data signal is greater than the level state of second data signal, the first output signal is 1 and the second output signal is 0. In this way, in a case that the circuit for data processing 10 is a data reading circuit, the first data signal in the high level state is successfully read and outputted. In a case that the circuit for data processing 10 is a comparator, the first output signal corresponds to the first data signal and the second output signal corresponds to the second data signal, so that the small difference between the first data signal and the second data signal is amplified obviously, that is, "the higher one is higher and the lower one is lower". In a case that the level state of the first data signal is smaller than the level state of second data signal, the situation is similar.

Figure 9:
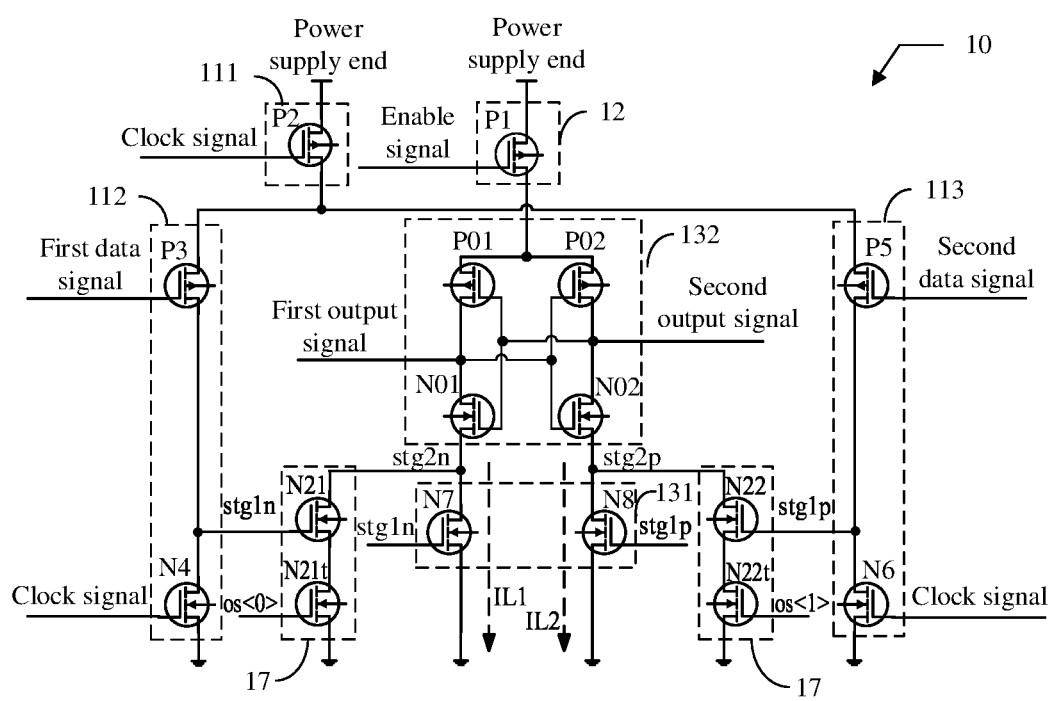
FIG. 9 is a second specific schematic structural diagram of a circuit for data processing according to an embodiment of the present disclosure.

In some embodiments, as shown in FIG. 9, the circuit for data processing 10 may further include a compensation circuit 17.

The compensation circuit 17 is configured to receive a compensating signal and determines, according to the compensating signal, a target compensating signal. Herein, the target compensating signal is configured to reduce current mismatch of the processing circuit 13.

The processing circuit 13 is specifically configured to output, in a case of being in the operating state, the target data signal according to the target compensating signal and the first node signal.

It is to be noted that there is current mismatch inevitably in a preparation process of the circuit. In FIG. 9, mismatch between the seventh switch N7 and the eighth switch N8 will cause a difference on current releasing capacities thereof to generate current mismatch, which may lead to a deviation of the target data signal outputted by the cross coupling circuit 132 and even inaccurate output. Therefore, in the embodiments of the present disclosure, the compensation circuit 17 may be further additionally arranged in the circuit for data processing 10. As shown in FIG. 9, the initial compensating signal may include a first initial compensating signal os<0> and a second os<1>. The target compensating signal may include a first target compensating signal and a second target compensating signal. The compensation circuit 17 may include four NMOSs: N21, N21t, N22 and N22t. The first ends of the four NMOSs may be the drains and the second ends thereof may be the sources.

Specifically, the gate of N21 is connected to the first sub node stg1n, the first end of N21 is connected to the third sub node stg2n, the second end of N21 is connected to the first end of N21t, the gate of N21t receives the first initial compensating signal os<0>, and the second end of N21t is grounded. The gate of N22 is connected to the second sub node stg1p, the first end of N22 is connected to the fourth sub node stg2p, the second end of N22 is connected to the first end of N22t, the gate of N22t receives the second initial compensating signal os<1>, and the second end of N22t is grounded.

N21 and N21t are mainly used to compensate current mismatch of the seventh switch N7, and N22 and N22t are mainly used to compensate current mismatch of the eighth switch N8. In this way, in the compensation circuit 17, N21t receives the first initial compensating signal, N21 receives the first sub node signal, the first end of N21t is connected to the second end of N21, and the first target compensating signal is finally outputted at the first end of N21 to compensate the output at the first end of the seventh switch N7, so that the third sub node signal is more accurate. N22t receives the second initial compensating signal, N22 receives the second sub node signal, the first end of N22t is connected to the second end of N22, and the second target compensating signal is finally outputted at the first end of N22 to compensate the output at the first end of the eighth switch N8, so that the fourth sub node signal is more accurate.

Therefore, compensated by the compensation circuit 17, the seventh switch N7 and the eighth switch N8 have the same circuit releasing capacity and may process the signals with same driving capability. In this way, the processing circuit 13 in the operating state may output the target data signal in conjunction with the target compensating signal and the first node signal.

The embodiments of the present disclosure provide a circuit for data processing. The circuit for data processing includes a receiving circuit, a first power supply circuit and a processing circuit. The receiving circuit is configured to receive a data signal and determine a first node signal according to the data signal. The first power supply circuit is configured to receive an enable signal, and control, in a case that the enable signal is in a valid state, the processing circuit to be in an operating state. The processing circuit is configured to output, in a case of being in the operating state, a target data signal according to the first node signal. Thus, the first power supply circuit controls the operating state of the processing circuit via the enable signal, so that the processing circuit is in the operating state only when the enable signal is in the valid state, and the processing circuit is in the non-operating state in a case that the enable signal is in the invalid state, that is, the enable signal enters a standby mode. Therefore, the leak current of the circuit for data processing in the standby mode is effectively reduced, so that power consumption is saved.

Figure 10:
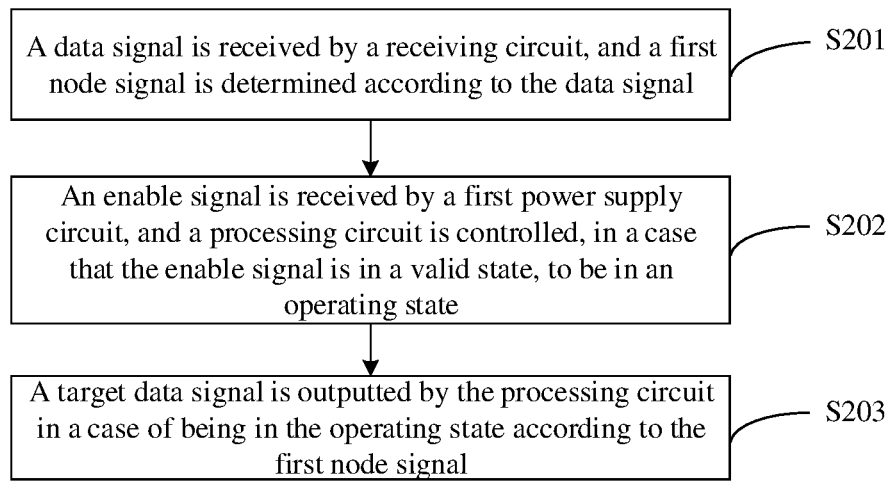
FIG. 10 is a flowchart of a circuit for data processing according to an embodiment of the present disclosure.

In an embodiment of the present disclosure, based on the circuit for data processing 10 according to any one of above-mentioned embodiments, referring to FIG. 10, FIG. 10 illustrates a flowchart of a circuit for data processing according to an embodiment of the present disclosure. As shown in the FIG. 10, the method may include the following operations.

At S201, a data signal is received by a receiving circuit, and a first node signal is determined according to the data signal.

At S202, an enable signal is received by a first power supply circuit, and a processing circuit is controlled, in a case that the enable signal is in a valid state, to be in an operating state.

At S203, a target data signal is outputted by the processing circuit in a case of being in the operating state according to the first node signal.

In some embodiments, the circuit for data processing further includes a latch circuit. The method may further include the following operations.

A first sampled signal and a second sampled signal are received by the latch circuit, and latch processing is performed on the first sampled signal and the second sampled signal to generate the enable signal.

The second sampled signal is delayed by a preset clock period with respect to the first sampled signal, and the enable signal is valid within the preset clock period.

In some embodiments, the circuit for data processing further includes a first sampling circuit and a second sampling circuit. The method further includes the following operations.

A first enable signal and a clock signal are received by the first sampling circuit, and sampling processing is performed on the first enable signal according to the clock signal to generate the first sampled signal.

A second enable signal and the clock signal are received by the second sampling circuit, and sampling processing is performed on the second enable signal according to the clock signal to generate the second sampled signal.

In some embodiments, the first enable signal includes a command signal, and the second enable signal includes the first sampled signal.

In some embodiments, the first power supply circuit includes a first switch. The operation that an enable signal is received by a first power supply circuit, and a processing circuit is controlled, in a case that the enable signal is in a valid state, to be in an operating state includes the following operations.

The enable signal is received by the control end of the first switch, and in a case that the enable signal is in the valid state, the first switch is in the on state, to enable the processing circuit to be in the operating state; and in a case that the enable signal is in the invalid state, the first switch is in the off state, to enable the processing circuit to be in the non-operating state.

In some embodiments, the receiving circuit includes a second power supply circuit, a first control circuit and a second control circuit. The operation that a data signal is received by a receiving circuit, and a first node signal is determined according to the data signal includes the following operations.

The clock signal is received by the second power supply circuit, and a connection state between the power supply end and the first control circuit and a connection state between the power supply end and the second control circuit are controlled according to the clock signal.

A first data signal is received by the first control circuit, and the first data signal is controlled according to the connection state between the power supply end and the first control circuit to generate a first sub node signal.

A second data signal is received by the second control circuit, and the second data signal is controlled according to the connection state between the power supply end and the second control circuit to generate a second sub node signal.

In some embodiments, the second power supply circuit includes a second switch. The operation that the clock signal is received by the second power supply circuit, and a connection state between the power supply end and the first control circuit and a connection state between the power supply end and the second control circuit are controlled according to the clock signal includes the following operations.

The clock signal is received by the control end of the second switch, the second switch is controlled, in a case that the clock signal is in a first level state, to be in an on state, to enable the power supply end and the first control circuit to be in the connection state and the power supply end and the second control circuit to be in the connection state; and the second switch is controlled, in a case that the clock signal is in a second level state, to be in an off state, to enable the power supply end and the first control circuit to be in the non-connection state and the power supply end and the second control circuit to be in the non-connection state.

In some embodiments, the first control circuit includes a third switch and a fourth switch, and the second control circuit includes a fifth switch and a sixth switch. The method may further include the following operations.

The first data signal is received by the control end of the third switch, and the clock signal is received by the control end of the fourth switch. The first sub node signal is outputted by the first end of the third switch and the first end of the fourth switch.

The second data signal is received by the control end of the fifth switch, and the clock signal is received by the control end of the sixth switch. The second sub node signal is outputted by the first end of the fifth switch and the first end of the sixth switch.

In some embodiments, the method may further include the following operations.

In a case that the clock signal in the first level state, the fourth switch is controlled to be in the off state by the first control circuit, and in a case that the clock signal is in the second level state, the fourth switch is controlled to be in the on state by the first control circuit.

In a case that the clock signal in the first level state, the sixth switch is controlled to be in the off state by the second control circuit, and in a case that the clock signal is in the second level state, the sixth switch is controlled to be in the on state by the second control circuit.

In some embodiments, the processing circuit includes a differential circuit and a cross coupling circuit. The operation that a target data signal is outputted according to the first node signal includes the following operations.

The first sub node signal and the second sub node signal are received by the differential circuit, and differential processing is performed on the first sub node signal and the second sub node signal to generate a third sub node signal and a fourth sub node signal.

Amplification processing is performed on the third sub node signal and the fourth sub node signal by the cross coupling circuit to generate a first output signal and a second output signal. Herein, the target data signal is composed of the first output signal and the second output signal.

In some embodiments, the differential circuit includes a seventh switch and an eighth switch. The operation that the first sub node signal is received by the differential circuit to generate a third sub node signal includes the following operation.

The first sub node signal is received by the control end of the seventh switch, and the third sub node signal is outputted by the first end of the seventh switch.

The operation that the second sub node signal is received by the differential circuit to generate a fourth sub node signal includes the following operation.

The second sub node signal is received by the control end of the eighth switch, and the fourth sub node signal is outputted by the first end of the eighth switch.

In some embodiments, the cross coupling circuit includes a first PMOS, a second PMOS, a first NMOS and a second NMOS. The operation that amplification processing is performed on the third sub node signal and the fourth sub node signal by the cross coupling circuit to generate a first output signal and a second output signal includes the following operations.

The third sub node signal is received by a source of the first NMOS and the first end of the seventh switch.

The fourth sub node signal is received by a source of the second PMOS and the first end of the eighth switch.

The first output signal is outputted by a drain of the first PMOS and a drain of the first NMOS.

The second output signal is outputted by a drain of the second PMOS and a drain of the second NMOS.

The second output signal is received by a gate of the first PMOS and a gate of the first NMOS.

The first output signal is received by a gate of the second PMOS and a gate of the second NMOS.

In some embodiments, in a case that the enable signal is in the valid state and the clock signal is in the first level state:

in response to a level state of the first data signal being greater than a level state of the second data signal, the first output signal is a first value and the second output signal is a second value; and in response to the level state of the first data signal being smaller than the level state of the second data signal, the first output signal is the second value and the second output signal is the first value.

In some embodiments, the circuit for data processing may further include a precharging circuit. The method further includes the following operations.

An initial data signal outputted by the processing circuit is precharged by the precharging circuit.

Correspondingly, the operation that a target data signal is outputted by the processing circuit in a case of being in the operating state according to the first node signal includes the following operation.

Signal amplification is performed by the processing circuit in the case of being in the operating state according to the first node signal and the initial data signal, and the target data signal is outputted.

In some embodiments, the circuit for data processing may further include a compensation circuit. The method further includes the following operations.

A compensating signal is received by the compensation circuit, and a target compensating signal is determined according to the compensating signal. Herein, the target compensating signal is configured to reduce current mismatch of the processing circuit.

Correspondingly, the operation that a target data signal is outputted by the processing circuit in a case of being in the operating state according to the first node signal includes the following operation.

The target data signal is outputted by the processing circuit in the case of being in the operating state according to the target compensating signal and the first node signal.

Details undisclosed in the embodiments of the present disclosure may be understood with reference to the descriptions of the above-mentioned embodiments.

The embodiments of the present disclosure provide a method for data processing, which is applied to the above-mentioned circuit for data processing. During data processing, the operating state of the processing circuit is controlled by the first power supply circuit and the enable signal, so that the processing circuit is in the operating state only when the enable signal is in the valid state, and the processing circuit is in the non-operating state in a case that the enable signal is in the invalid state, that is, the enable signal enters a standby mode. Therefore, the leak current of the circuit for data processing in the standby mode is effectively reduced, so that power consumption is saved.

Figure 11:
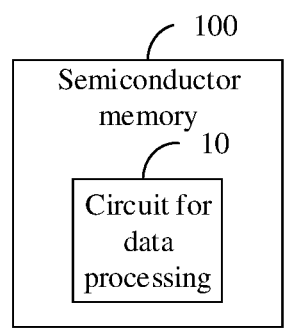
FIG. 11 is a schematic structural diagram of a semiconductor memory according to an embodiment of the present disclosure.

In another embodiment of the present disclosure, referring to FIG. 11, FIG. 11 illustrates a schematic structural diagram of a semiconductor memory 100 according to an embodiment of the present disclosure. As shown in FIG. 11, the semiconductor memory 100 may include the circuit for data processing 10 according to any one of the above-mentioned embodiments.

For the semiconductor memory 100, since the semiconductor memory includes the circuit for data processing 10 in the above-mentioned embodiments, the leak current may be effectively reduced, and the power consumption is saved.

The above are only the preferred embodiments of the present disclosure, and are not intended to limit the scope of protection of the present disclosure.

It is to be noted that in present disclosure, the terms "including", "containing" or any other variation thereof are intended to cover non-exclusive inclusion, so that a process, method, article or device including a series of elements includes not only those elements, but also other elements not explicitly listed, or elements inherent to the process, method, article or device. Without more restrictions, an element defined by the sentence "including a . . . " does not exclude the existence of other identical elements in the process, method, article, or device including the element.

The above numbers of the embodiments of the present disclosure are only for description, and do not represent the advantages or disadvantages of the embodiments.

The methods disclosed in the several method embodiments provided in the present disclosure may be combined arbitrarily without conflict to obtain new method embodiments. The features disclosed in the several product embodiments provided in the present disclosure may be combined arbitrarily without conflict to obtain new product embodiment. The features disclosed in several method or device embodiments provided in the present disclosure may be combined arbitrarily without conflict to obtain new method embodiments or device embodiments.

The above are only the specific implementation modes of the present disclosure and not intended to limit the scope of protection of the present disclosure. Any variations or replacements apparent to those skilled in the art within the technical scope disclosed by the disclosure shall fall within the scope of protection of the present disclosure. Therefore, the scope of protection of the present disclosure shall be subject to the scope of protection of the claims.

The embodiments of the present disclosure provide a circuit and method for data processing, and a semiconductor memory. The circuit for data processing includes a receiving circuit, a first power supply circuit and a processing circuit. The receiving circuit is configured to receive a data signal and determine a first node signal according to the data signal. The first power supply circuit is configured to receive an enable signal, and control, in a case that the enable signal is in a valid state, the processing circuit to be in an operating state. The processing circuit is configured to output, in a case of being in the operating state, a target data signal according to the first node signal. Thus, the first power supply circuit controls the operating state of the processing circuit via the enable signal, so that the processing circuit is in the operating state only when the enable signal is in the valid state, and the processing circuit is in the non-operating state in a case that the enable signal is in the invalid state, that is, the enable signal enters a standby mode. Therefore, the leak current of the circuit for data processing in the standby mode is effectively reduced, so that power consumption is saved.

What is claimed is:

1. A circuit for data processing, comprising: a receiving circuit, a first power supply circuit and a processing circuit, wherein
the receiving circuit is configured to receive a data signal and determine a first node signal according to the data signal;
the first power supply circuit is configured to receive an enable signal, and control, in a case that the enable signal is in a valid state, the processing circuit to be in an operating state; and
the processing circuit is configured to output, in a case of being in the operating state, a target data signal according to the first node signal;
the circuit for data processing further comprising: a latch circuit, wherein
the latch circuit is configured to receive a first sampled signal and a second sampled signal, and perform latch processing on the first sampled signal and the second sampled signal to generate the enable signal;
wherein the second sampled signal is delayed by a preset clock period with respect to the first sampled signal, and the enable signal is valid within the preset clock period.

2. The circuit for data processing of claim 1, further comprising: a first sampling circuit and a second sampling circuit, wherein
the first sampling circuit is configured to receive a first enable signal and a clock signal, and perform, according to the clock signal, sampling processing on the first enable signal to generate the first sampled signal; and
the second sampling circuit is configured to receive a second enable signal and the clock signal, and perform, according to the clock signal, sampling processing on the second enable signal to generate the second sampled signal.

3. The circuit for data processing of claim 2, wherein the first enable signal and the second enable signal are command signals;
the first sampling circuit comprises N first flip-flops, clock ends of the first flip-flops are used to receive the clock signal, an output end of an i-th one of the first flip-flops is connected to an input end of an (i+1)-th one of the first flip-flops, an input end of a first one of the first flip-flops is used to receive the first enable signal, and an output end of an N-th one of the first flip-flops is used to output the first sampled signal, where i is an integer greater than 0 and smaller than N, and N is an integer greater than 0; and
the second sampling circuit comprises M second flip-flops, clock ends of the second flip-flops are used to receive the clock signal, an output end of a j-th one of the second flip-flops is connected to an input end of a (j+1)-th one of the second flip-flops, an input end of a first one of the second flip-flops is used to receive the second enable signal, and an output end of an M-th one of the second flip-flops is used to output the second sampled signal, where j is an integer greater than 0 and smaller than M, and M is an integer greater than 0.

4. The circuit for data processing of claim 2, wherein the first enable signal comprises a command signal, and the second enable signal comprises the first sampled signal;
the first sampling circuit comprises N first flip-flops, clock ends of the first flip-flops are used to receive the clock signal, an output end of an i-th one of the first flip-flops is connected to an input end of an (i+1)-th one of the first flip-flops, an input end of a first one of the first flip-flops is used to receive the command signal, and an output end of an N-th one of the first flip-flops is used to output the first sampled signal, where i is an integer greater than 0 and smaller than N, and N is an integer greater than 0; and
the second sampling circuit comprises M second flip-flops, clock ends of the second flip-flops are used to receive the clock signal, an output end of a j-th one of the second flip-flops is connected to an input end of a (j+1)-th one of the second flip-flops, an input end of a first one of the second flip-flops is connected to the output end of the N-th one of the first flip-flops to receive the first sampled signal, and an output end of an M-th one of the second flip-flops is used to output the second sampled signal, where j is an integer greater than 0 and smaller than M, and M is an integer greater than 0.

5. The circuit for data processing of claim 3, wherein the latch circuit comprises a latch, a first input end of the latch being connected to the output end of the N-th one of the first flip-flops to receive the first sampled signal, a second input end of the latch being connected to the output end of the M-th one of the second flip-flops to receive the second sampled signal, and an output end of the latch being used to output the enable signal.

6. The circuit for data processing of claim 1, further comprising:
a precharging circuit, wherein the precharging circuit is configured to precharge an initial data signal outputted by the processing circuit; and
the processing circuit is further configured to: in the case of being in the operating state, perform, according to the first node signal and the initial data signal, signal amplification, and output the target data signal.

7. The circuit for data processing of claim 1, further comprising:
a compensation circuit, wherein
the compensation circuit is configured to receive a compensating signal and determines, according to the compensating signal, a target compensating signal, wherein the target compensating signal is configured to reduce current mismatch of the processing circuit; and
the processing circuit is specifically configured to output, in the case of being in the operating state, the target data signal according to the target compensating signal and the first node signal.

8. A circuit for data processing, comprising: a receiving circuit, a first power supply circuit and a processing circuit, wherein
the receiving circuit is configured to receive a data signal and determine a first node signal according to the data signal;
the first power supply circuit is configured to receive an enable signal, and control, in a case that the enable signal is in a valid state, the processing circuit to be in an operating state; and the processing circuit is configured to output, in a case of being in the operating state, a target data signal according to the first node signal;

wherein the first power supply circuit comprises a first switch, a control end of the first switch being configured to receive the enable signal, a first end of the first switch being connected to the processing circuit, and a second end of the first switch being connected to a power supply end; and the first power supply circuit is configured to: control, in the case that the enable signal is in the valid state, the first switch to be in an on state, to enable the processing circuit to be in the operating state; and control, in a case that the enable signal in an invalid state, the first switch to be in an off state, to enable the processing circuit to be in a non-operating state, wherein the receiving circuit comprises a second power supply circuit, a first control circuit and a second control circuit;

wherein the second power supply circuit is configured to receive a clock signal, and control, according to the clock signal, a connection state between the power supply end and the first control circuit and a connection state between the power supply end and the second control circuit;

the first control circuit is configured to receive a first data signal, and control, according to the connection state between the power supply end and the first control circuit, the first data signal to generate a first sub node signal; and the second control circuit is configured to receive a second data signal, and control, according to the connection state between the power supply end and the second control circuit, the second data signal to generate a second sub node signal.

9. The circuit for data processing of claim 8, wherein the second power supply circuit comprises a second switch, a control end of the second switch being configured to receive the clock signal, a first end of the second switch being respectively connected to the first control circuit and the second control circuit, and a second end of the second switch being connected to the power supply end;

wherein the second power supply circuit is configured to: control, in a case that the clock signal is in a first level state, the second switch to be in the on state, to enable the power supply end and the first control circuit to be in the connection state and the power supply end and the second control circuit to be in the connection state; and control, in a case that the clock signal is in a second level state, the second switch to be in the off state, to enable the power supply end and the first control circuit to be in a non-connection state and the power supply end and the second control circuit to be in the non-connection state.

10. The circuit for data processing of claim 9, wherein the first control circuit comprises a third switch and a fourth switch, and the second control circuit comprises a fifth switch and a sixth switch;

wherein a control end of the third switch is configured to receive the first data signal, a second end of the third switch is connected to a first end of the second switch, a control end of the fourth switch is configured to receive the clock signal, and a second end of the fourth switch is grounded; a first end of the third switch is connected to a first end of the fourth switch, and is configured to output the first sub node signal; and a control end of the fifth switch is configured to receive the second data signal, a second end of the fifth switch is connected to the first end of the second switch, a control end of the sixth switch is configured to receive the clock signal, and a second end of the sixth switch is grounded; a first end of the fifth switch is connected to a first end of the sixth switch, and is configured to output the second sub node signal.

11. The circuit for data processing of claim 10, wherein the first control circuit is configured to control, in a case that the clock signal is in the first level state, the fourth switch to be in the off state, and control, in a case that the clock signal is in the second level state, the fourth switch to be in the on state; and the second control circuit is configured to control, in a case that the clock signal in the first level state, the sixth switch to be in the off state, and control, in a case that the clock signal is in the second level state, the sixth switch to be in the on state.

12. The circuit for data processing of claim 10, wherein the processing circuit comprises a differential circuit and a cross coupling circuit;

wherein the differential circuit is configured to receive the first sub node signal and the second sub node signal, and perform differential processing on the first sub node signal and the second sub node signal to generate a third sub node signal and a fourth sub node signal;

the cross coupling circuit is configured to perform amplification processing on the third sub node signal and the fourth sub node signal to generate a first output signal and a second output signal, wherein the target data signal is composed of the first output signal and the second output signal.

13. The circuit for data processing of claim 12, wherein the differential circuit comprises a seventh switch and an eighth switch;

wherein a control end of the seventh switch is connected to the first end of the third switch and the first end of the fourth switch and is configured to receive the first sub node signal, a first end of the seventh switch is connected to the cross coupling circuit and is configured to output the third sub node signal, and a second end of the seventh switch is grounded; and a control end of the eighth switch is connected to the first end of the fifth switch and the first end of the sixth switch and is configured to receive the second sub node signal, a first end of the eighth switch is connected to the cross coupling circuit and is configured to output the fourth sub node signal, and a second end of the eighth switch is grounded.

14. The circuit for data processing of claim 13, wherein the cross coupling circuit comprises a first Positive channel Metal-Oxide-Semiconductor (PMOS), a second PMOS, a first Negative channel Metal-Oxide-Semiconductor (NMOS) and a second NMOS; wherein a source of the first PMOS is connected to a source of the second PMOS and the first end of the first switch;

a drain of the first PMOS is connected to a drain of the first NMOS to output the first output signal;

a drain of the second PMOS is connected to a drain of the second NMOS to output the second output signal;

a gate of the first PMOS is connected to a gate of the first NMOS to receive the second output signal;

a gate of the second PMOS is connected to a gate of the second NMOS to receive the first output signal;

a source of the first NMOS is connected to the first end of the seventh switch to receive the third sub node signal; and a source of the second NMOS is connected to the first end of the eighth switch to receive the fourth sub node signal.

15. The circuit for data processing of claim 12, wherein in a case that the enable signal is in the valid state and the clock signal is in the first level state:
   in response to a level state of the first data signal being greater than a level state of the second data signal, the first output signal is a first value and the second output signal is a second value; and
   in response to the level state of the first data signal being smaller than the level state of the second data signal, the first output signal is the second value and the second output signal is the first value.

16. A circuit for data processing, comprising: a receiving circuit, a first power supply circuit and a processing circuit, wherein
   the receiving circuit is configured to receive a data signal and determine a first node signal according to the data signal;
   the first power supply circuit is configured to receive an enable signal, and control, in a case that the enable signal is in a valid state, the processing circuit to be in an operating state; and
   the processing circuit is configured to output, in a case of being in the operating state, a target data signal according to the first node signal;
   a latch circuit, wherein
   the latch circuit is configured to receive a first sampled signal and a second sampled signal, and perform latch processing on the first sampled signal and the second sampled signal to generate the enable signal;
   wherein the second sampled signal is delayed by a preset clock period with respect to the first sampled signal, and the enable signal is valid within the preset clock period.

17. A circuit for data processing, comprising: a receiving circuit, a first power supply circuit and a processing circuit, wherein
   the receiving circuit is configured to receive a data signal and determine a first node signal according to the data signal;
   the first power supply circuit is configured to receive an enable signal, and control, in a case that the enable signal is in a valid state, the processing circuit to be in an operating state; and
   the processing circuit is configured to output, in a case of being in the operating state, a target data signal according to the first node signal;
   a compensation circuit, wherein
   the compensation circuit is configured to receive a compensating signal and determines, according to the compensating signal, a target compensating signal, wherein the target compensating signal is configured to reduce current mismatch of the processing circuit; and
   the processing circuit is specifically configured to output, in the case of being in the operating state, the target data signal according to the target compensating signal and the first node signal.

* * * * *